(12) United States Patent
Wang et al.

(10) Patent No.: US 12,317,280 B2
(45) Date of Patent: May 27, 2025

(54) INDICATION METHOD, TERMINAL, AND NETWORK DEVICE

(71) Applicant: DATANG MOBILE COMMUNICATIONS EQUIPMENT CO., LTD., Beijing (CN)

(72) Inventors: Lei Wang, Beijing (CN); Yanping Xing, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 344 days.

(21) Appl. No.: 17/799,630

(22) PCT Filed: Jan. 14, 2021

(86) PCT No.: PCT/CN2021/071708
§ 371 (c)(1),
(2) Date: Aug. 12, 2022

(87) PCT Pub. No.: WO2021/159911
PCT Pub. Date: Aug. 19, 2021

(65) Prior Publication Data
US 2023/0073520 A1  Mar. 9, 2023

(30) Foreign Application Priority Data
Feb. 12, 2020 (CN) .......................... 202010087995.5

(51) Int. Cl.
*H04W 72/12* (2023.01)
*H04W 48/12* (2009.01)
(Continued)

(52) U.S. Cl.
CPC ........... *H04W 72/23* (2023.01); *H04W 48/12* (2013.01)

(58) Field of Classification Search
CPC ..... H04L 5/001; H04L 5/0053; H04L 5/0094; H04W 48/12; H04W 72/0453; H04W 72/23; H04W 72/232
See application file for complete search history.

(56) References Cited

U.S. PATENT DOCUMENTS

2011/0228732 A1* 9/2011 Luo .................... H04L 5/001
370/329
2012/0320838 A1  12/2012 Yang
(Continued)

FOREIGN PATENT DOCUMENTS

CN  102088776 A   6/2011
CN  102783064 A  11/2012
(Continued)

OTHER PUBLICATIONS

International Search Report in the international application No. PCT/CN2021/071708, mailed on Apr. 15, 2021 and English translation provided by WIPO.
(Continued)

Primary Examiner — Awet Haile
(74) Attorney, Agent, or Firm — Ladas & Parry, LLP

(57) ABSTRACT

The present disclosure provides an indication method, a terminal and a network device. The method includes: receiving DCI sent by a network device, wherein the DCI does not include a CIF; determining a target carrier corresponding to the DCI, according to a rule agreed with the network device.

16 Claims, 4 Drawing Sheets

(51) Int. Cl.
  *H04W 72/14*    (2009.01)
  *H04W 72/23*    (2023.01)

(56) References Cited

U.S. PATENT DOCUMENTS

| | | |
|---|---|---|
| 2012/0320840 A1 | 12/2012 | Kim |
| 2014/0376490 A1* | 12/2014 | McBeath ............... H04L 5/003 370/329 |
| 2015/0280850 A1 | 10/2015 | Liu |
| 2018/0115399 A1* | 4/2018 | Takeda ................. H04L 5/0053 |
| 2019/0150173 A1 | 5/2019 | Lee et al. |
| 2020/0169990 A1* | 5/2020 | Takeda ..................... H04J 1/00 |
| 2021/0345333 A1* | 11/2021 | Jiang ...................... H04L 5/001 |

FOREIGN PATENT DOCUMENTS

| | | |
|---|---|---|
| CN | 102812659 A | 12/2012 |
| WO | 2019030931 A1 | 2/2019 |
| WO | 2021159911 A1 | 8/2021 |

OTHER PUBLICATIONS

Written Opinion of the International Search Authority in the international application No. PCT/CN2021/071708, mailed on Apr. 15, 2021 and English translation provided by WIPO.
International Preliminary Report on Patentability in the international application No. PCT/CN2021/071708 Aug. 11, 2022, and English translation provided by WIPO.
"DCI formats which can include carrier indicator field," 3GPP TSG-RAN1 #59bis, R1-100724, Agenda Item: 7.1.5, Source: Fujitsu, Valencia, Spain, Jan. 18-22, 2010, all pages.
First Office Action and search report for Chinese Patent Application No. 202010087995.5 issued on Apr. 2, 2022 and its English translation provided by Global Dossier.
Extended European Search Report for the corresponding European Patent Application No. 21753576.4 issued by the European Patent Office on Jul. 4, 2023.

* cited by examiner

INDICATION METHOD, TERMINAL, AND NETWORK DEVICE

CROSS-REFERENCE TO RELATED APPLICATIONS

This application is the U.S. national phase of PCT Application No. PCT/CN2021/071708 filed on Jan. 14, 2021, which claims priority to Chinese Patent Application No. 202010087995.5 filed in China on Feb. 12, 2020, the disclosures of which are incorporated in their entireties by reference herein.

TECHNICAL FIELD

The present disclosure relates to the field of communication technology, in particular to an indication method, a terminal, and a network device.

BACKGROUND

In a wireless system of related art, if the terminal is configured with the carrier aggregation mode, the terminal will only monitor the corresponding physical downlink control channel (PDCCH) on the scheduling carrier. The downlink control information (DCI) carried on the PDCCH includes a carrier indicator field (CIF), which is used to indicate the scheduling carrier corresponding to the terminal. Therefore, when performing cross-carrier scheduling, only the DCI format including CIF can be used for scheduling. However, when the DCI does not include carrier indicator information, the terminal cannot determine the carrier index indicated by the DCI, and thus the corresponding operations cannot be completed.

SUMMARY

An embodiment of the present disclosure provides an indication method, a terminal, and a network device, so as to solve the problem that the terminal cannot determine the target carrier when the DCI does not include the CIF.

In the first aspect, an embodiment of the present disclosure provides an indication method, including:
receiving downlink control information (DCI) sent by a network device, wherein the DCI does not include a carrier indicator field (CIF);
determining a target carrier corresponding to the DCI, according to a rule agreed with the network device.

Optionally, the determining the target carrier corresponding to the DCI, according to the rule agreed with the network device, includes:
determining the target carrier, according to a $n_{CI}$ indicated by cross-carrier related information configured by the network device and a resource position occupied by a physical downlink control channel (PDCCH) candidate in a search space;
wherein, the $n_{CI}$ is determined according to a radio resource control (RRC) parameter configured by the network device.

Optionally, search spaces corresponding to different carriers do not overlap in resources, or
PDCCH candidates with a same aggregation level (AL) in the search spaces corresponding to the different carriers do not completely overlap, or
some or all of the PDCCH candidates with the same AL in the search spaces corresponding to the different carriers completely overlap.

Optionally, when at least two PDCCH candidates belonging to the different carriers completely overlap, a target carrier of DCI received on the PDCCH candidate is a carrier with a lowest index or a highest index among the different carriers, or a carrier corresponding to a lowest or a highest $n_{CI}$ value among the different carriers.

Optionally, the determining the target carrier corresponding to the DCI, according to the rule agreed with the network device, includes:
determining the target carrier corresponding to the DCI, according to RRC signaling of the network device.

Optionally, the determining the target carrier corresponding to the DCI, according to the rule agreed with the network device, includes:
determining the target carrier corresponding to the DCI, according to a manner predefined in the protocol.

In the second aspect, an embodiment of the present disclosure provides an indication method, including:
determining a target carrier according to a rule agreed with a terminal;
sending DCI to the terminal on a scheduling carrier, wherein the DCI does not include a carrier indicator field (CIF).

Optionally, the determining the target carrier according to the rule agreed with the terminal, includes:
determining the target carrier through a $n_{CI}$ indicated by cross-carrier related information and a resource position occupied by a physical downlink control channel (PDCCH) candidate;
wherein, the $n_{CI}$ is configured through a RRC parameter.

Optionally, the determining the target carrier, according to the rule agreed with the terminal, includes:
determining the target carrier through RRC signaling.

Optionally, the determining the target carrier according to the rule agreed with the terminal, includes:
determining the target carrier through a manner predefined in the protocol.

In the third aspect, an embodiment of the present disclosure provides a terminal, including:
a receiving module, configured to receive downlink control information (DCI) sent by a network device, wherein the DCI does not include a carrier indicator field (CIF);
a first determination module, configured to determine a target carrier corresponding to the DCI, according to a rule agreed with the network device.

Optionally, the first determination module is further configured to determine the target carrier, according to a $n_{CI}$ indicated by cross-carrier related information configured by the network device and a resource position occupied by a physical downlink control channel (PDCCH) candidate in a search space;
wherein, the $n_{CI}$ is determined according to a radio resource control (RRC) parameter configured by the network device.

Optionally, search spaces corresponding to different carriers do not overlap in resources, or
PDCCH candidates with a same aggregation level (AL) in the search spaces corresponding to the different carriers do not completely overlap, or
some or all of the PDCCH candidates with the same AL in the search spaces corresponding to the different carriers completely overlap.

Optionally, when at least two PDCCH candidates belonging to the different carriers completely overlap, a target carrier of DCI received on the PDCCH candidate is a carrier with a lowest index or a highest index among the different carriers, or a carrier corresponding to a lowest or a highest $n_{CI}$ value among the different carriers.

Optionally, the first determination module is further configured to determine the target carrier corresponding to the DCI, according to RRC signaling of the network device.

Optionally, the first determination module is further configured to determine the target carrier corresponding to the DCI, according to a manner predefined in the protocol.

In the fourth aspect, an embodiment of the present disclosure provides a network device, including:
 a second determination module, configured to determine a target carrier according to a rule agreed with a terminal;
 a sending module, configured to send DCI to the terminal on a scheduling carrier, wherein the DCI does not include a carrier indicator field (CIF).

Optionally, the second determination module is further configured to determine the target carrier through a $n_{CI}$ indicated by cross-carrier related information and a resource position occupied by a physical downlink control channel (PDCCH) candidate;
 wherein, the $n_{CI}$ is configured through a RRC parameter.

Optionally, search spaces corresponding to different carriers do not overlap in resources, or
 PDCCH candidates with a same aggregation level (AL) in the search spaces corresponding to the different carriers do not completely overlap, or
 some or all of the PDCCH candidates with the same AL in the search spaces corresponding to the different carriers completely overlap.

Optionally, when at least two PDCCH candidates belonging to the different carriers completely overlap, a target carrier of DCI received on the PDCCH candidates is a carrier with a lowest index or a highest index among the different carriers, or a carrier corresponding to a lowest or a highest $n_{CI}$ value among the different carriers.

Optionally, the second determination module is further configured to determine the target carrier through RRC signaling.

Optionally, the second determination module is further configured to determine the target carrier through a manner predefined in the protocol.

In the fifth aspect, an embodiment of the present disclosure provides a terminal, including a processor, a memory and a program stored on the memory and configured to be executed by the processor, the program being configured to be executed by the processor to implement operations of the indication method according to the first aspect.

In the sixth aspect, an embodiment of the present disclosure provides a network device, including a processor, a memory and a program stored on the memory and configured to be executed by the processor, the program being configured to be executed by the processor to implement operations of the indication method according to the second aspect.

In the seventh aspect, an embodiment of the present disclosure provides a processor-readable storage medium storing thereon a program, wherein the program is configured to be executed by the processor to implement operations of the indication method according to the first aspect or operations of the indication method according the second aspect.

According to the embodiments of the present disclosure, in the cross-carrier scheduling scenario, when the DCI sent on the scheduling carrier does not include a CIF, the terminal determines the target carrier corresponding to the DCI according to the rules agreed with the network device, so that the corresponding behavior on the target carrier can be performed.

BRIEF DESCRIPTION OF THE DRAWINGS

In order to more clearly illustrate the technical solutions of the embodiments of the present disclosure, the following is a brief description of the drawings used in the description of the embodiments of the present disclosure, and it is obvious that the drawings in the following description only correspond to some embodiments of the present disclosure, and other drawings can be obtained from these drawings without any creative work for a person of ordinary skill in the art.

DETAILED DESCRIPTION

Figure 1:
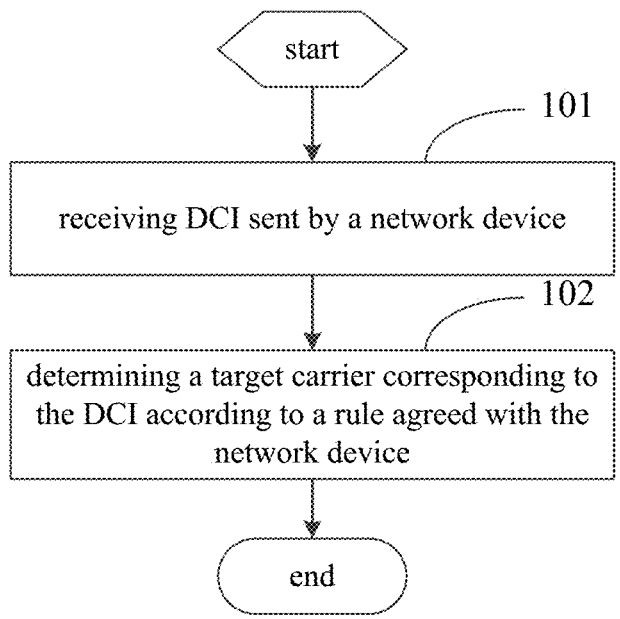
FIG. 1 is a schematic flowchart of an indication method according to an embodiment of the present disclosure.

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. Based on the embodiments in the present disclosure, all other embodiments obtained by those of ordinary skill in the art without creative efforts shall fall within the protection scope of the present disclosure.

In the embodiments of the present disclosure, words such as "exemplary" or "such as" are used to indicate an example, illustration, or description. Any embodiments or designs described as "exemplary" or "such as" in the embodiments of the present disclosure should not be construed as preferred or advantageous over other embodiments or designs. Rather, the use of words such as "exemplary" or "such as" is intended to present the related concepts in a specific manner.

Herein, relational terms such as "first" and "second" are used only to distinguish the same names, and do not imply a relationship or order between the names.

The techniques described herein are not limited to 5th-generation (5G) systems and subsequent evolved communication systems, and not limited to LTE/LTE-Advanced (LTE-A) systems, and can also be used in various wireless communication systems, such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems.

The terms "system" and "network" are often used interchangeably. A CDMA system may implement radio technologies such as CDMA2000, Universal Terrestrial Radio Access (UTRA), etc. UTRA includes Wideband Code Division Multiple Access (WCDMA) and other CDMA variants. A TDMA system may implement a radio technology such as the Global System for Mobile Communication (GSM). OFDMA systems can implement radio technologies such as Ultra Mobile Broadband (UMB), Evolution-UTRA (E-UTRA), IEEE 802.11 (Wi-Fi), IEEE 802.16 (WiMAX), IEEE 802.20, Flash-OFDM, etc. UTRA and E-UTRA are part of the Universal Mobile Telecommunications System (UMTS). LTE and LTE-Advanced (i.e., LTE-A) are new UMTS releases that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for both the systems and radio technologies mentioned above, as well as for other systems and radio technologies.

In this embodiment of the present disclosure, the terminal may be a mobile phone, a tablet computer, a notebook computer, an Ultra-Mobile Personal Computer (UMPC), a netbook, or a Personal Digital Assistant (PDA), etc.

In this embodiment of the present disclosure, the network device may be a network device (i.e., a next generation node base station, gNB) or a transmission and reception point (TRP) in a 5G system.

As shown in FIG. 1, an embodiment of the present disclosure provides an indication method. The execution subject of the method is a terminal, and the specific steps of the method are as follows.

Step 101: receiving the DCI sent by the network device.

In the embodiment of the present disclosure, the network configures a cross-carrier scheduling function for the terminal and sends a DCI on the scheduling carrier that schedules or indicates the behavior of the terminal on the scheduling carrier, and the DCI does not include a domain CIF.

It should be noted that the DCI can be any type of DCI format.

Step 102: determine the target carrier corresponding to the DCI according to the rule agreed with the network device.

In the embodiment of the present disclosure, in the cross-carrier scheduling scenario, when the DCI sent on the scheduling carrier does not include a CIF, the terminal determines the target carrier corresponding to the DCI according to the rules agreed with the network device.

Specifically, the terminal determining the target carrier corresponding to the DCI includes the following manners.

Manner 1: determining the target carrier, according to a $n_{CI}$ (also referred to as n_CI) indicated by cross-carrier related information configured by the network device and a resource position occupied by a physical downlink control channel (PDCCH) candidate in a search space;

in this embodiment of the present disclosure, the $n_{CI}$ is determined according to a radio resource control (RRC) parameter configured by the network device.

Optionally, search spaces corresponding to different carriers do not overlap in resources;

or, PDCCH candidates with a same aggregation level (AL) in the search spaces corresponding to the different carriers do not completely overlap;

or, some or all of the PDCCH candidates with the same AL in the search spaces corresponding to the different carriers completely overlap.

Further, when at least two PDCCH candidates belonging to the different carriers completely overlap, a target carrier of DCI received on the PDCCH candidate is a carrier with a lowest index or a highest index among the different carriers, or a carrier corresponding to a lowest or a highest $n_{CI}$ value among the different carriers.

Manner 2: after the terminal receives the DCI used for cross-carrier scheduling or cross-carrier indication does not include a CIF, it performs a corresponding behavior on a specific target carrier.

In some implementations, the target carrier corresponding to the DCI is determined according to RRC signaling of the network device.

In some implementations, the target carrier corresponding to the DCI is determined according to a manner predefined in the protocol.

In the embodiment of the present disclosure, in the cross-carrier scheduling scenario, when the DCI sent on the scheduling carrier does not include a CIF, the terminal determines the target carrier corresponding to the DCI according to the rules agreed with the network device, so that can perform the corresponding behavior on the target carrier.

Figure 2:
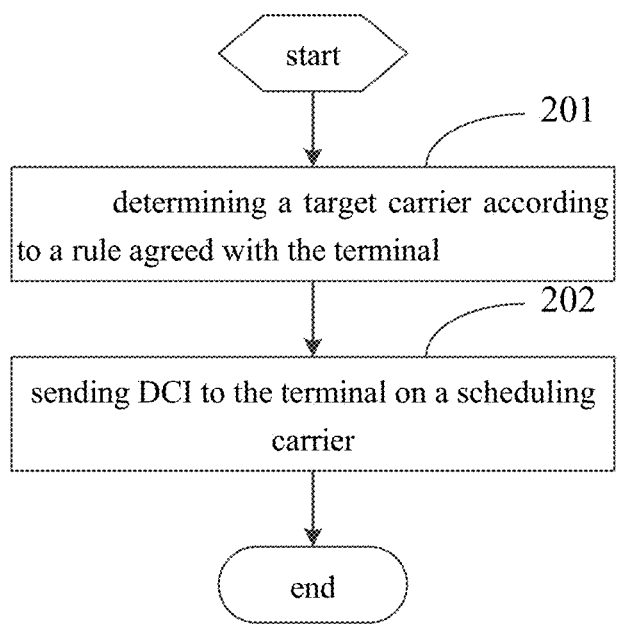
FIG. 2 is another schematic flowchart of an indication method according to an embodiment of the present disclosure.

As shown in FIG. 2, an embodiment of the present disclosure provides an indication method. The execution subject of the method is a network device, and the specific steps of the method are as follows.

Step 201: determine the target carrier according to the rule agreed with the terminal.

In the embodiment of the present disclosure, in the cross-carrier scheduling scenario, the network device determines the target carrier indicated by the terminal through a rule agreed with the terminal.

Specifically, the network device determining the target carrier includes the following manners.

Manner 1, determining the target carrier through a $n_{CI}$ indicated by cross-carrier related information and a resource position occupied by a physical downlink control channel (PDCCH) candidate;

in this embodiment of the present disclosure, the $n_{CI}$ is configured through a RRC parameter.

Optionally, search spaces corresponding to different carriers do not overlap in resources;

or, PDCCH candidates with a same aggregation level (AL) in the search spaces corresponding to the different carriers do not completely overlap;

or, some or all of the PDCCH candidates with the same AL in the search spaces corresponding to the different carriers completely overlap.

Further, when at least two PDCCH candidates belonging to the different carriers completely overlap, a target carrier of DCI received on the PDCCH candidates is a carrier with a lowest index or a highest index among the different carriers, or a carrier corresponding to a lowest or a highest $n_{CI}$ value among the different carriers.

Manner 2, indicating the terminal to perform a corresponding behavior on a specific target carrier.

In some implementations, the target carrier is determined through RRC signaling.

In some implementations, the target carrier is determined in a manner predefined in the protocol.

Step 202: sending DCI to the terminal on the scheduling carrier.

In the embodiment of the present disclosure, in the cross-carrier scheduling scenario, the DCI sent by the network device on the scheduling carrier does not include the carrier indicator, and the DCI is used to indicate the behavior of the terminal on the target carrier.

In the embodiment of the present disclosure, in the cross-carrier scheduling scenario, when the DCI sent on the scheduling carrier does not include a CIF, the terminal determines the target carrier corresponding to the DCI according to the rules agreed with the network device, so that it can perform the corresponding behavior on the target carrier.

The method will be described below in conjunction with specific application embodiments.

Embodiment 1

The network side device is configured with a cross-carrier scheduling function, and the terminal detects and receives downlink control channels on the scheduling carrier. The network side configures the scheduling carrier for the terminal through high-layer signaling RRC signaling. The network side device indicates the behavior of the terminal on the target carrier through DCI without CIF on the scheduling carrier, such as indicating the terminal to send and receive data on the target carrier, indicating the terminal to perform contention-free random access (CFRA) related operations on the target carrier, etc. The network side device configures the CIF for the terminal, which corresponds to the parameter n_CI in the search space hash function.

Figure 3A:
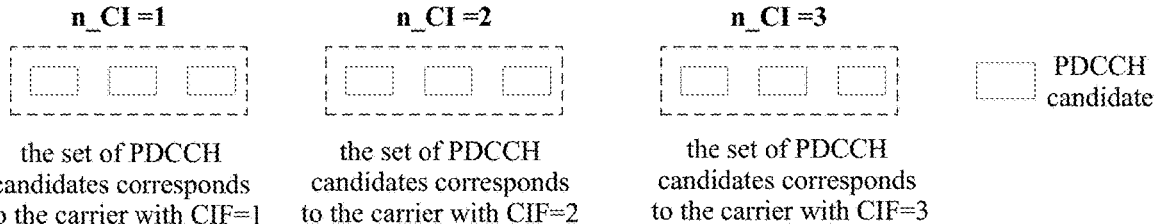
FIG. 3a is a schematic diagram of an application scenario according to an embodiment of the present disclosure.

When the base station configures CORESET and search space for the terminal, it should ensure that the search spaces corresponding to different carriers do not have any overlap in resources. The base station sends DCI on the PDCCH candidate corresponding to the target carrier, and after receiving the PDCCH, the terminal determines the target carrier corresponding to the DCI according to the resource position of the received PDCCH candidate. As shown in FIG. 3a, FIG. 3a is a schematic diagram of a search space transmitted on a scheduling carrier or a primary carrier, assuming that the base station configures three carriers for the terminal, and the CIFs corresponding to each carrier are 1, 2, and 3, respectively. Then, when the base station expects to instruct the terminal to perform a corresponding behavior on the target carrier 1, it sends the downlink control channel on the PDCCH candidate determined by n_CI=1. After detecting and receiving the downlink control channel on the PDCCH candidate corresponding to n_CI=1, the terminal determines to perform the corresponding behavior on the corresponding target carrier according to the indication of the base station, that is, on target carrier 1.

Embodiment 2

The network side device is configured with a cross-carrier scheduling function, and the terminal detects and receives downlink control channels on the scheduling carrier. The network side device configures the scheduling carrier for the terminal through high-layer signaling RRC signaling. The network side device indicates the behavior of the terminal on the target carrier through DCI without CIF on the scheduling carrier, such as indicating the terminal to send and receive data on the target carrier, indicating the terminal to perform CFRA related operations on the target carrier, etc. The network side device configures the CIF for the terminal, which corresponds to the parameter n_CI in the search space hash function.

Figure 3B:
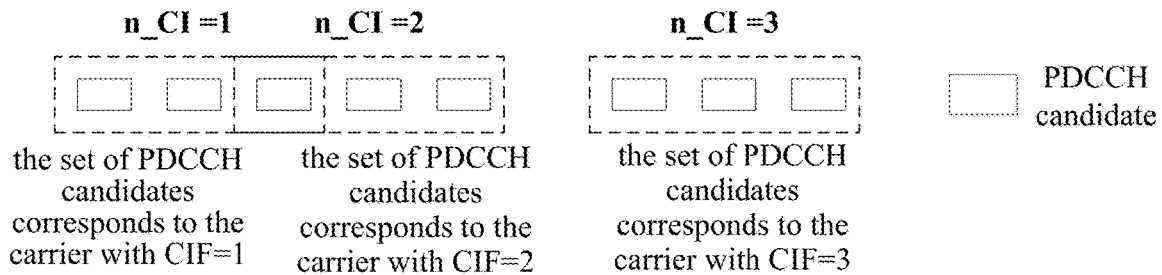
FIG. 3b is another schematic diagram of an application scenario according to an embodiment of the present disclosure.

The base station configures CORESET and search space for the terminal, the PDCCH candidates with the same AL in the search space of different carriers may overlap. The base station sends DCI on the PDCCH candidate corresponding to the target carrier, and after receiving the PDCCH, the terminal determines the target carrier corresponding to the DCI according to the resource position of the received PDCCH candidate. As shown in FIG. 3b, FIG. 3b is a schematic diagram of a search space transmitted on a scheduling carrier or a primary carrier, assuming that the base station configures three carriers for the terminal, and the CIFs corresponding to each carrier are 1, 2, and 3, respectively. The partial PDCCH candidates of target carrier 1 and target carrier 2 overlap. When the base station sends DCI on the overlapping PDCCH candidate, the base station and the terminal determine the target carrier corresponding to the PDCCH according to the following rules:

the DCI transmitted by the base station on the PDCCH candidate corresponds to the carrier with the lowest or highest n_CI value;

or, the DCI transmitted by the base station on the PDCCH candidate corresponds to the carrier with the lowest or highest carrier index among the overlapping carriers.

Embodiment 3

The network side device performs the uplink synchronization operation through the CFRA. The base station sends the PDCCH order on the scheduling carrier and activates preamble transmission on the target carrier. The PDCCH order is sent in the form of DCI without CIF. At this time, the base station and the terminal use a unified mechanism to determine the target carrier where the preamble transmission activated by the PDCCH order is sent.

The base station configures the target cell index corresponding to the PDCCH order through explicit high-layer RRC signaling;

or, the base station and the terminal determine the target cell index corresponding to the PDCCH order in a manner predefined by the protocol.

It should be noted that, as described in Embodiment 3, the method can also be applied to other scenarios such as data scheduling, and details are not repeated here.

Further, as described in Embodiments 1 to 3, the DCI format that does not include CIF may be fallback DCI format (i.e., DCI format 0_0, DCI format 1_0), or non-fallback DCI without CIF field configuration (i.e., DCI format 0_1, DCI format 0_2, DCI format 1_1, DCI format 1_2), or other types of DCI formats, which are not limited in this embodiment of the present disclosure.

Figure 4:
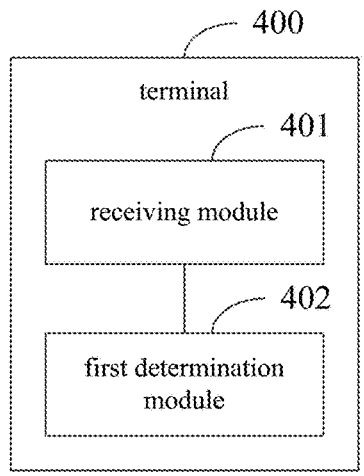
FIG. 4 is a schematic structural diagram of a terminal according to an embodiment of the present disclosure.

As shown in FIG. 4, an embodiment of the present disclosure provides a terminal 400, including:
 a receiving module 401, configured to receive the downlink control information (DCI) sent by a network device, wherein the DCI does not include a carrier indicator field (CIF);
 a first determination module 402, configured to determine a target carrier corresponding to the DCI, according to a rule agreed with the network device.

Optionally, the first determination module 402 is further configured to the target carrier, according to a $n_{CI}$ indicated by cross-carrier related information configured by the network device and a resource position occupied by a physical downlink control channel (PDCCH) candidate in a search space;

wherein, the $n_{CI}$ is determined according to a radio resource control (RRC) parameter configured by the network device.

Optionally, search spaces corresponding to different carriers do not overlap in resources, or PDCCH candidates with a same aggregation level (AL) in the search spaces corresponding to the different carriers do not completely overlap, or some or all of the PDCCH candidates with the same AL in the search spaces corresponding to the different carriers completely overlap.

Optionally, when at least two PDCCH candidates belonging to the different carriers completely overlap, a target carrier of DCI received on the PDCCH candidate is a carrier with a lowest index or a highest index among the different carriers, or a carrier corresponding to a lowest or a highest $n_{CI}$ value among the different carriers.

Optionally, the first determination module 402 is further configured to determine the target carrier corresponding to the DCI according to the RRC signaling of the network device.

Optionally, the first determination module 402 is further configured to determine a target carrier corresponding to the DCI according to a manner predefined in the protocol.

In the embodiment of the present disclosure, in the cross-carrier scheduling scenario, when the DCI sent on the scheduling carrier does not include a CIF, the terminal determines the target carrier corresponding to the DCI according to the rules agreed with the network device, so that it can perform the corresponding behavior on the target carrier.

Figure 5:
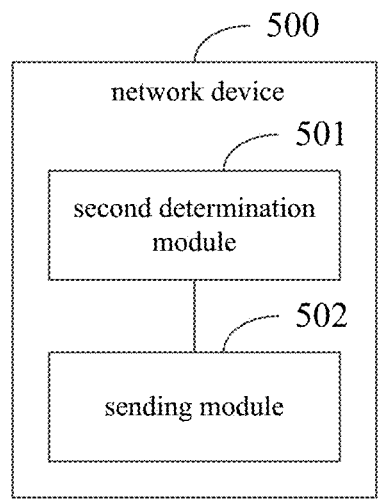
FIG. 5 is a schematic structural diagram of a network device according to an embodiment of the present disclosure.

As shown in FIG. 5, an embodiment of the present disclosure provides a network device 500, including:

a second determination module 501, configured to determine a target carrier according to a rule agreed with a terminal;

a sending module 502, configured to send DCI to the terminal on the target carrier, where the DCI does not include a carrier indicator field (CIF).

Optionally, the second determination module 501 is further configured to determine the target carrier through a $n_{CI}$ indicated by cross-carrier related information and a resource position occupied by a physical downlink control channel (PDCCH) candidate;

wherein, the $n_{CI}$ is configured through a RRC parameter.

Optionally, search spaces corresponding to different carriers do not overlap in resources, or PDCCH candidates with a same aggregation level (AL) in the search spaces corresponding to the different carriers do not completely overlap, or some or all of the PDCCH candidates with the same AL in the search spaces corresponding to the different carriers completely overlap.

Optionally, when at least two PDCCH candidates belonging to the different carriers completely overlap, a target carrier of DCI received on the PDCCH candidates is a carrier with a lowest index or a highest index among the different carriers, or a carrier corresponding to a lowest or a highest $n_{CI}$ value among the different carriers.

Optionally, the second determination module 501 is further configured to determine the target carrier through RRC signaling.

Optionally, the second determination module 501 is further configured to determine the target carrier through a manner predefined in the protocol.

In the embodiment of the present disclosure, in the cross-carrier scheduling scenario, when the DCI sent on the scheduling carrier does not include a CIF, the terminal determines the target carrier corresponding to the DCI according to the rules agreed with the network device, so that it can perform the corresponding behavior on the target carrier.

Figure 6:
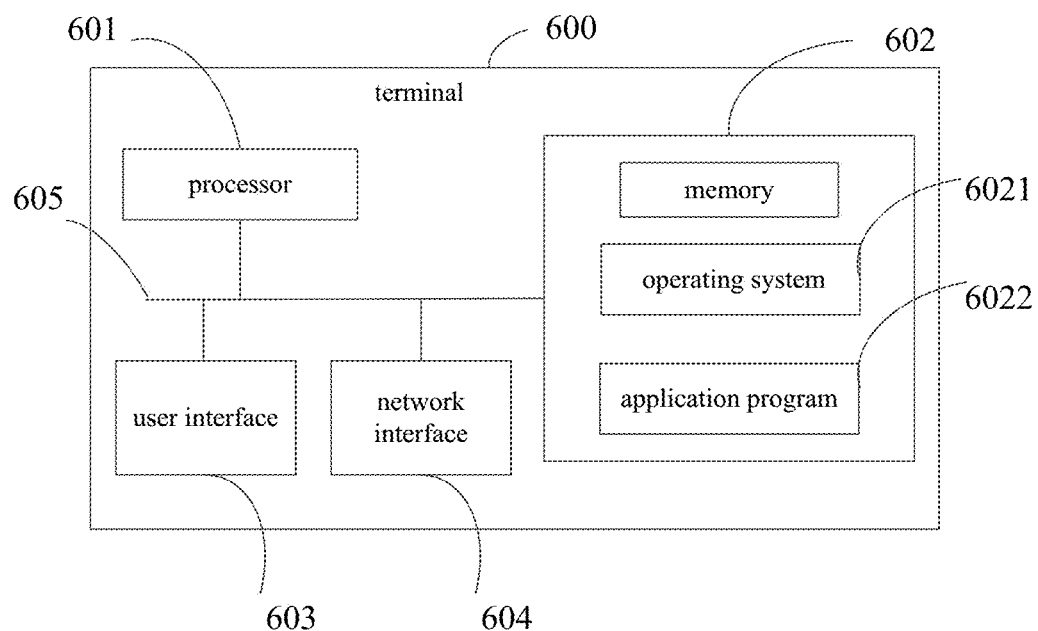
FIG. 6 is another schematic structural diagram of a terminal according to an embodiment of the present disclosure.

As shown in FIG. 6, an embodiment of the present disclosure provides another terminal 600, including: at least a processor 601, a memory 602, a user interface 603 and at least a network interface 604. The various components in terminal 600 are connected together by bus system 605.

It can be understood that the bus system 605 is used to implement the connection communication between these components. In addition to the data bus, the bus system 605 also includes a power bus, a control bus, and a status signal bus. However, for clarity of illustration, the various buses are labeled as bus system 605 in FIG. 6.

The user interface 603 may include a display, a keyboard, or a pointing device (i.e., a mouse, a trackball, a touch pad or a touch screen, etc.).

It is to be understood that the memory 602 in embodiments of the present disclosure may be volatile memory or non-volatile memory, or may include both volatile and non-volatile memory. Wherein, the non-volatile memory can be read-only memory (ROM), Programmable ROM (PROM), Erasable PROM (EPROM), Electrically EPROM (EEPROM) or flash memory. Volatile memory can be random access memory (RAM), which is used as an external cache. By way of illustration but not restrictive description, many forms of RAM are available, such as Static RAM (SRAM), Dynamic RAM (DRAM), Synchronous DRAM (SDRAM), Double Data Rate SDRAM (DDRSDRAM), Enhanced SDRAM (ESDRAM), synchronous link DRAM (SLDRAM) and Direct Rambus RAM (DRRAM). The memory 602 described in embodiments of the present disclosure is intended to include, but not be limited to, these and any other suitable types of memory.

In some embodiments, memory 602 stores the following elements, executable modules or data structures, or subsets thereof, or extended sets of them: operating system 6021 and application program 6022.

The operating system 6021 includes various system programs, such as a framework layer, a core library layer, a driver layer, etc., for implementing various basic services and processing hardware-based tasks. The application program 6022 includes various application programs, such as media players, browsers, etc., for implementing various application services. A program implementing the method of the embodiment of the present disclosure may be included in the application program 6022.

In this embodiment of the present disclosure, the terminal 600 may further include a program stored on the memory 602 and configured to be executed by the processor 601, the program being configured to be executed by the processor 601 to implement the steps in the method provided by the embodiment of the present disclosure.

The methods disclosed in the above embodiments of the present disclosure may be applied to the processor 601 or be implemented by the processor 601. The processor 601 may be an integrated circuit chip with signal processing capability. In the implementation process, each step of the above-mentioned method may be completed by an integrated logic circuit of hardware in the processor 601 or an instruction in the form of software. The processor 601 described above may be a general-purpose processor, a Digital Signal Processor (DSP), an Application Specific Integrated Circuit (ASIC), a Field Programmable Gate Array (FPGA) or other programmable logic device, discrete gate or transistor logic device, or discrete hardware component. The processor may implement or perform the respective methods, steps, and logic block diagrams described in embodiments of the present disclosure. The general-purpose processor may be a microprocessor, or the processor may also be any conventional processor, etc. The steps of the method disclosed in the embodiments of the present disclosure may be directly implemented by the hardware decode processor or implemented with a combination of hardware and software modules in the decode processor. The software module may be located in random memory, flash memory, read-only memory, programmable read-only memory or electrically erasable programmable memory, registers, and other computer readable storage media that are well established in the art. The computer-readable storage medium is located in the memory 602, and the processor 601 reads the information in the memory 602 and completes the steps of the above method in combination with its hardware. Specifically, the computer-readable storage medium has a computer program stored hereon.

It can be understood that the embodiments described in the present disclosure may be implemented by hardware, software, firmware, middleware, microcode, or a combination of them. For hardware implementation, module, unit, and subunit can be implemented in one or more application-specific integrated circuits (ASIC), digital signal processor (DSP), digital signal processing device (DSP Device, DSPD), programmable logic device (PLD), Field-Programmable Gate Array (FPGA), general-purpose processors, controllers, microcontrollers, microprocessors, and others for performing the functions described in this disclosure electronic unit or the combination thereof.

For a software implementation, the technology described in the embodiments of the present disclosure can be implemented by modules (for example, procedures, functions, etc.) that perform the functions described in the embodiments of the present disclosure. The software codes can be stored in the memory and executed by the processor. The memory can be implemented in the processor or external to the processor.

Figure 7:
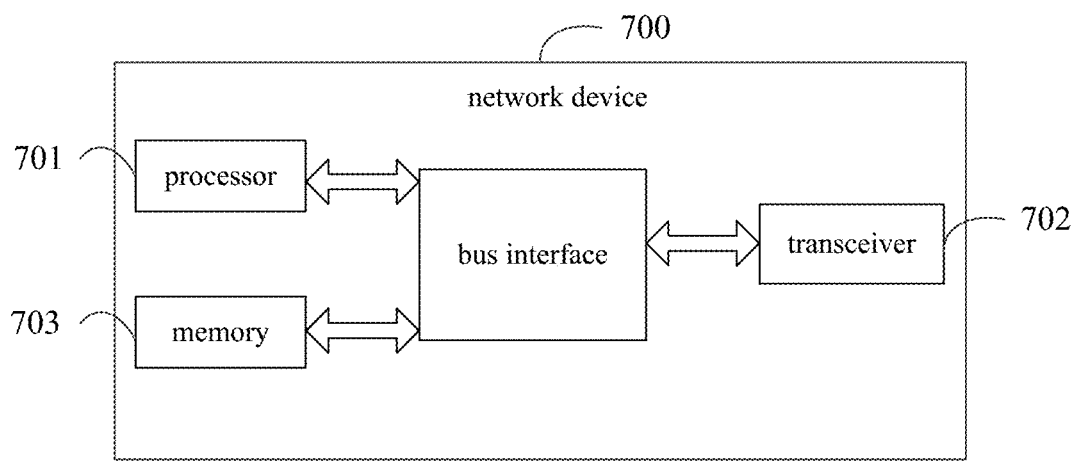
FIG. 7 is another schematic structural diagram of a network device according to an embodiment of the present disclosure.

As shown in FIG. 7, an embodiment of the present disclosure provides another network device 700, including: a processor 701, a transceiver 702, a memory 703, and a bus interface.

The processor 701 may be responsible for managing the bus architecture and general processing. Memory 703 may store data used by processor 701 when performing operations.

In this embodiment of the present disclosure, the network device 700 may further include: a program stored on the memory 703 and configured to be executed by the processor 701, the program being configured to be executed by the processor 701 to implement the steps in the method provided by the embodiment of the present disclosure.

In FIG. 7, the bus architecture may include any number of interconnected buses and bridges, specifically various circuits such as one or more processors represented by the processor 701 and the memory represented by the memory 703 are connected together. The bus architecture can also connect various other circuits such as peripheral devices, voltage regulators, power management circuits, etc., which are all known in the field, and therefore, will not be further described in the embodiments of the present disclosure. The bus interface provides the interface. The transceiver 702 may be a plurality of elements, that is, including a transmitter and a receiver, and provide a unit for communicating with various other devices on the transmission medium.

The embodiments of the present disclosure further provide a computer-readable storage medium storing thereon a computer program. When the computer program is executed by a processor, each process of the above-mentioned information transmission method embodiment is realized, and the same technical effect can be achieved. In order to avoid repetition, a detailed description thereof is omitted. The computer-readable storage medium is, for example, a read-only memory (ROM), random access memory (RAM), magnetic disk, or optical disc, etc.

It should be noted that, herein, the terms "comprising", "including" or any other variation thereof are intended to encompass non-exclusive inclusion, such that a process, method, article or device comprising a series of elements includes not only those elements, but also other elements not expressly listed, or which are inherent to such a process, method, article or apparatus. Without further limitation, the inclusion of an element defined by the phrase "comprising a . . . " does not preclude the existence of another identical elements in the process, method, article or apparatus that includes the element.

The above are only specific implementations of the present disclosure, but the protection scope of the present disclosure is not limited to this, and any changes or substitutions within the technical scope disclosed in the present disclosure should be covered within the protection scope of the present disclosure. Therefore, the protection scope of the present disclosure should be subject to the protection scope of the claims.

What is claimed is:

1. An indication method, applied to a terminal, comprising:
   receiving downlink control information (DCI) sent by a network device, wherein the DCI does not include a carrier indicator field (CIF);
   determining a target carrier corresponding to the DCI according to a rule agreed with the network device,
   wherein the determining the target carrier corresponding to the DCI according to the rule agreed with the network device, comprises:
   determining the target carrier, according to a parameter $n_{CI}$ indicated by cross-carrier related information configured by the network device and a resource position occupied by a physical downlink control channel (PDCCH) candidate in a search space and according to a resource position of a PDCCH candidate on which the DCI is received;
   wherein, the $n_{CI}$ is determined according to a radio resource control (RRC) parameter configured by the network device.

2. The method according to claim 1, wherein,
   search spaces corresponding to different carriers do not overlap in resources, or
   PDCCH candidates with a same aggregation level (AL) in the search spaces corresponding to the different carriers do not completely overlap, or
   some or all of the PDCCH candidates with the same AL in the search spaces corresponding to the different carriers completely overlap.

3. The method according to claim 2, wherein,
   when at least two PDCCH candidates belonging to the different carriers completely overlap, the target carrier of DCI received on the PDCCH candidate is a carrier with a lowest index or a highest index among the different carriers, or a carrier corresponding to a lowest or a highest $n_{CI}$ value among the different carriers.

4. The method according to claim 1, wherein the determining the target carrier corresponding to the DCI according to the rule agreed with the network device, comprises:
  determining the target carrier corresponding to the DCI according to RRC signaling of the network device, or determining the target carrier corresponding to the DCI according to a manner predefined in a protocol.

5. An indication method, applied to a network device, comprising:
  determining a target carrier according to a rule agreed with a terminal;
  sending DCI to the terminal on a scheduling carrier, wherein the DCI does not include a carrier indicator field (CIF),
  wherein, the determining the target carrier according to the rule agreed with the terminal, comprises:
  determining the target carrier according to a parameter $n_{CI}$ indicated by cross-carrier related information and a resource position occupied by a physical downlink control channel PDCCH) candidate and according to a resource position of a PDCCH candidate on which the DCI is received;
  wherein, the $n_{CI}$ is configured according to a radio resource control (RRC) parameter.

6. The method according to claim 5, wherein,
  search spaces corresponding to different carriers do not overlap in resources, or
  PDCCH candidates with a same aggregation level (AL) in the search spaces corresponding to the different carriers do not completely overlap, or
  some or all of the PDCCH candidates with the same AL in the search spaces corresponding to the different carriers completely overlap.

7. The method according to claim 6, wherein,
  when at least two PDCCH candidates belonging to the different carriers completely overlap, the target carrier of DCI received on the PDCCH candidates is a carrier with a lowest index or a highest index among the different carriers, or a carrier corresponding to a lowest or a highest $n_{CI}$ value among the different carriers.

8. The method according to claim 5, wherein, the determining the target carrier according to the rule agreed with the terminal, comprises:
  determining the target carrier through RRC signaling, or
  determining the target carrier through a manner predefined in a protocol.

9. A terminal, comprising a processor, a memory and a program stored on the memory and configured to be executed by the processor; wherein the program is configured to be executed by the processor to implement the following steps:
  receiving downlink control information (DCI) sent by a network device, wherein the DCI does not include a carrier indicator field (CIF);
  determining a target carrier corresponding to the DCI according to a rule agreed with the network device,
  wherein the determining the target carrier corresponding to the DCI according to the rule agreed with the network device, comprises:
  determining the target carrier according to a parameter $n_{CI}$ indicated by cross-carrier related information configured by the network device and a resource position occupied by a physical downlink control channel (PDCCH) candidate in a search space and according to a resource position of a PDCCH candidate on which the DCI is received;
  wherein, the $n_{CI}$ is determined according to a radio resource control (RRC) parameter configured by the network device.

10. The terminal according to claim 9, wherein,
  search spaces corresponding to different carriers do not overlap in resources, or
  PDCCH candidates with a same aggregation level (AL) in the search spaces corresponding to the different carriers do not completely overlap, or
  some or all of the PDCCH candidates with the same AL in the search spaces corresponding to the different carriers completely overlap.

11. The terminal according to claim 10, wherein,
  when at least two PDCCH candidates belonging to the different carriers completely overlap, the target carrier of DCI received on the PDCCH candidate is a carrier with a lowest index or a highest index among the different carriers, or a carrier corresponding to a lowest or a highest $n_{CI}$ value among the different carriers.

12. The terminal according to claim 9, wherein the determining the target carrier corresponding to the DCI according to the rule agreed with the network device, comprises:
  determining the target carrier corresponding to the DCI according to RRC signaling of the network device, or
  determining the target carrier corresponding to the DCI according to a manner predefined in a protocol.

13. A network device, comprising a processor, a memory and a program stored on the memory and configured to be executed by the processor, wherein the program is configured to be executed by the processor to implement steps of the indication method according to claim 5.

14. The network device according to claim 13, wherein,
  search spaces corresponding to different carriers do not overlap in resources, or
  PDCCH candidates with a same aggregation level (AL) in the search spaces corresponding to the different carriers do not completely overlap, or
  some or all of the PDCCH candidates with the same AL in the search spaces corresponding to the different carriers completely overlap.

15. The network device according to claim 14, wherein,
  when at least two PDCCH candidates belonging to the different carriers completely overlap, the target carrier of DCI received on the PDCCH candidates is a carrier with a lowest index or a highest index among the different carriers, or a carrier corresponding to a lowest or a highest $n_{CI}$ value among the different carriers.

16. The network device according to claim 13, wherein, the determining the target carrier according to the rule agreed with the terminal, comprises:
  determining the target carrier through RRC signaling, or
  determining the target carrier through a manner predefined in a protocol.

* * * * *